United States Patent [19]
Patel et al.

[11] Patent Number: 5,175,764
[45] Date of Patent: Dec. 29, 1992

[54] ENHANCED HIGH VOLTAGE LINE INTERFACE CIRCUIT

[75] Inventors: Lalit O. Patel, Mesa; Michael Warner, Phoenix; Absar Naseer, Mesa, all of Ariz.

[73] Assignee: AG Communication Systems Corporation, Phoenix, Ariz.

[21] Appl. No.: 599,537

[22] Filed: Oct. 18, 1990

[51] Int. Cl.⁵ .......................................... H04M 19/00
[52] U.S. Cl. .................... 379/412; 379/399; 379/413; 379/322
[58] Field of Search ............... 379/412, 399, 413, 414, 379/386, 322, 318, 324, 252

[56] References Cited

U.S. PATENT DOCUMENTS

| | | | |
|---|---|---|---|
| 4,275,277 | 6/1981 | Ferrieu | 379/413 X |
| 4,476,350 | 10/1984 | Aull et al. | 379/413 X |
| 4,685,130 | 8/1987 | Burns | 379/399 X |
| 4,852,162 | 7/1989 | Taya et al. | 379/413 |
| 4,864,609 | 9/1989 | Moisin | 379/413 |
| 4,866,767 | 9/1989 | Tanimoto et al. | 379/413 X |
| 4,866,768 | 9/1989 | Sinberg | 379/399 X |
| 5,014,305 | 5/1991 | Moisin | 379/399 X |

Primary Examiner—James L. Dwyer
Assistant Examiner—M. Shehata
Attorney, Agent, or Firm—Gregory G. Hendricks

[57] ABSTRACT

An enhanced high voltage line interface circuit for a digital switching system over which a connection is established between a digital switching system and a subscriber instrument via a subscriber loop. The high voltage line interface circuit includes in combination circuits that provide power to the subscriber loop and convert received analog voice signals transmitted from the subscriber instrument into differential voltage voice signals for subsequent conversion to digital data for use by the digital switching system. Additionally, differential voltage voice signals from the digital switching system are converted to analog voice signals for transmission along the subscriber loop to the subscriber instrument. The high voltage line interface circuit further includes circuits that detect and monitor the subscriber loop status and develop digital logic output signals that are used to report the status of the loop to a digital switching system controller.

19 Claims, 3 Drawing Sheets

ENHANCED HIGH VOLTAGE LINE INTERFACE CIRCUIT

CROSS-REFERENCE TO RELATED APPLICATIONS

Cross reference is made to the following related Application entitled: "An Enhanced Subscriber Line Interface Circuit", (Ser. No. 07/599,535); "A Hybrid Balance And Combination Coded Filter Circuit", (Ser. No. 07/599,533); "An Over-Current Detector Circuit For An Enhanced Subscriber Line Interface", (Ser. No. 07/599,536); and "A Ringing Signal Control, Circuit For An Enhanced Subscriber Line Interface", (Ser. No. 07/599,534), filed on the same date as the instant Application, and having a common assignee.

BACKGROUND OF THE INVENTION

1. Field of the Invention

The present invention relates in general to the field of telecommunications, and more particularly, to an enhanced High Voltage Line Interface (HVLI) circuit.

2. Description of the Prior Art

Subscriber line interface circuits (SLIC) are customarily found in the central office exchange of a telecommunications network. The SLIC weds the digital switching network of the central office exchange to a plurality of analog subscriber lines. The analog subscriber lines connect to subscriber stations or telephone instruments found at subscriber locations remote from the central office exchange.

The SLIC functions to supply power to a subscriber station and to transmit and receive voice signals between the digital switching network and the subscriber station.

Modern solid state SLICs are constructed using specialized integrated circuits. This construction dispenses with the need for inductive components in the analog end of the interface. The operating environment of the SLIC includes a necessity to provide high voltages and currents, used for analog voice transmission and substation signalling, as well as, low voltage digital logic signals used for the transmission of digital data between the SLIC and the digital switching network.

In many presently known telephone line circuits the battery feed function has been performed by using a passive, highly balanced, split winding transformer and or inductors which carry up to 120 ma dc. This passive circuit has a wide dynamic range, passing noise-free differential signals while not overloading with the 60 Hz longitudinal induced currents. The line circuit just described, feeds dc current to the subscriber loop and also provides the voice path for coupling the voice signal between the subscriber station and the central office. The electromagnetic components of passive line circuits are normally bulky and heavy and consume large amounts of power for short subscriber loop lengths where the current fed to the subscriber station is more than necessary for equalization. Active line-feed circuits can be less bulky and require lower total power, but meeting dynamic range and precision balance requirements dictates an overly complex circuit design.

Recently, solid state replacements for the electromagnetic components of the aforementioned line circuits have been developed. Such as the High Voltage Line Interface (HVLI) circuit described in patent application Ser. No. 445,516, filed Dec. 4, 1989, entitled "High Voltage Subscriber Line Interface Circuit", having a common assignee with the present invention.

Several other devices, such as, high voltage bipolar transistors and other specialized integrated circuits are being designed to replace the heavy and bulky components of the electromagnetic line circuit. Such a device is described in the IEEE JOURNAL OF SOLID-STATE CIRCUITS, VOL. SC-16, NO. 4, August 1981, entitled, "A High-Voltage IC for a Transformerless Trunk and Subscriber Line Interface." These smaller and lighter components allow the manufacture of telephone switching systems having more line circuits per circuit card as well as decreasing the physical size of the switching system.

However, presently known high voltage ICs, still suffer from deficiencies in meeting good transmission performance specifications. These deficiencies manifest themselves in poor longitudinal balance and poor longitudinal current susceptibility, which cause the circuit to fail or to become noisy. Other problems presently encountered are excessive power dissipation at short loops that consume prodigious amounts of central office power and 2 wire input impedance circuits that are complex and/or that exhibit poor return loss.

Accordingly, it is an object of the present invention to provide an enhanced high voltage line interface circuit that will effectively and efficiently couple a subscriber station apparatus to a telephone switching system.

SUMMARY OF THE INVENTION

The above and other objects, advantages, and capabilities are realized in an enhanced high voltage line interface circuit connected to a subscriber instrument via the tip lead and a ring lead of a subscriber loop. The enhanced high voltage line interface circuit comprises in combination:

A tip drive amplifier circuit and a ring drive amplifier circuit are each connected to the tip and ring lead respectively of the subscriber loop. The tip drive and ring drive amplifiers are arranged to convert feed voltage from a central office battery to tip feed current and ring feed current on the subscriber loop.

A common-mode sensing circuit is connected to the tip and the ring leads and to the tip drive and the ring drive amplifier circuits. The common-mode sensing circuit is arranged to sense the voltage dropped across the subscriber loop and to output a control voltage to the tip drive and ring drive amplifier circuits, for controlling the tip feed current and the ring feed current produced by the tip drive ring drive amplifier circuits, respectively.

A tip current sensing circuit is also connected to the tip lead. The tip current sensing circuit is arranged to develop an output signal when it senses current flow in the subscriber loop, such as when the subscriber instrument is placed off-hook. Similarly, a ring current sensing circuit is connected to the ring lead of the subscriber loop. The ring current sensing circuit develops an output signal when it detects current flow in the ring lead of subscriber loop, such as when the ring lead at the subscriber instrument is connected to earth ground.

A tip lead protection circuit connected to the tip lead provides a means of detecting overcurrent conditions in the tip lead. The tip lead protection circuit is arranged to produce an output voltage that is proportional to the current flowing in the subscriber loop. Similarly, a ring lead protection circuit connected to the ring lead of the subscriber loop detects overcurrent conditions in the ring lead.

A differential amplifier circuit connected to the tip lead and the ring lead senses the voltage difference between the tip lead and the ring lead that is associated with the transmission of voice signals from the subscriber instrument. The differential amplifier circuit develops single ended output signals responsive to the voice signal transmissions. The single ended output of the differential amplifier circuit is connected to a transmit amplifier circuit. The transmit amplifier circuit converts the differential amplifier circuit single ended output into a fully differential voltage representation of the voice signal transmissions for the subsequent conversion to Pulse Code Modulation (PCM) digital data.

A line sensing circuit is connected to the output signals from the tip current sensing circuit and the ring current sensing circuit. The line sensing circuit is arranged to generate a logic output that signals a system controller that a current is flowing in the tip lead of the subscriber loop. The line sensing circuit further receives the output voltages from the tip lead protection circuit and the ring lead protection circuit. When either the tip lead or the ring lead protection circuit output voltage exceeds a preset threshold, the line sensing circuit generates a logic signal output that signals to a system controller that an overcurrent condition exists in the subscriber loop.

A ring trip circuit is included that is connected to the subscriber loop during the application of ringing signals. The ring trip circuit is arranged to sense and develop a ring trip output signal responsive to the detection of a dc current flowing in the subscriber loop during a ringing cycle.

A selection circuit is connected to the ring trip amplifier circuit and the line sensing circuit. The selection circuit receives the ring trip output signal and the ring sense amplifier output signal, develops a logic level signal conveying to the system controller that either a ring trip or a ground sense condition, has occurred in the subscriber loop.

A battery feed circuit receives the output signal of the differential amplifier circuit and a precision reference current. The battery feed circuit sums the differential amplifier circuit output signal with the precision reference current and applies to the tip drive circuit and the ring drive circuit a bipolar drive voltage for controlling the subscriber loop current.

Finally, a receive amplifier circuit is connected to a source of differential voltage audio voice signals that are intended to be transmitted to the subscriber instrument. The receive amplifier circuit converts the differential voltage voice signals to single ended voice signals and transmits the single ended voice signals to the tip drive circuit and the ring drive circuit for transmission to the subscriber instrument.

BRIEF DESCRIPTION OF THE DRAWINGS

A better understanding of the invention may be had from the consideration of the following detailed description taken in conjunction with the accompanying drawings in/which.

DESCRIPTION OF A PREFERRED EMBODIMENT

Figure 1:
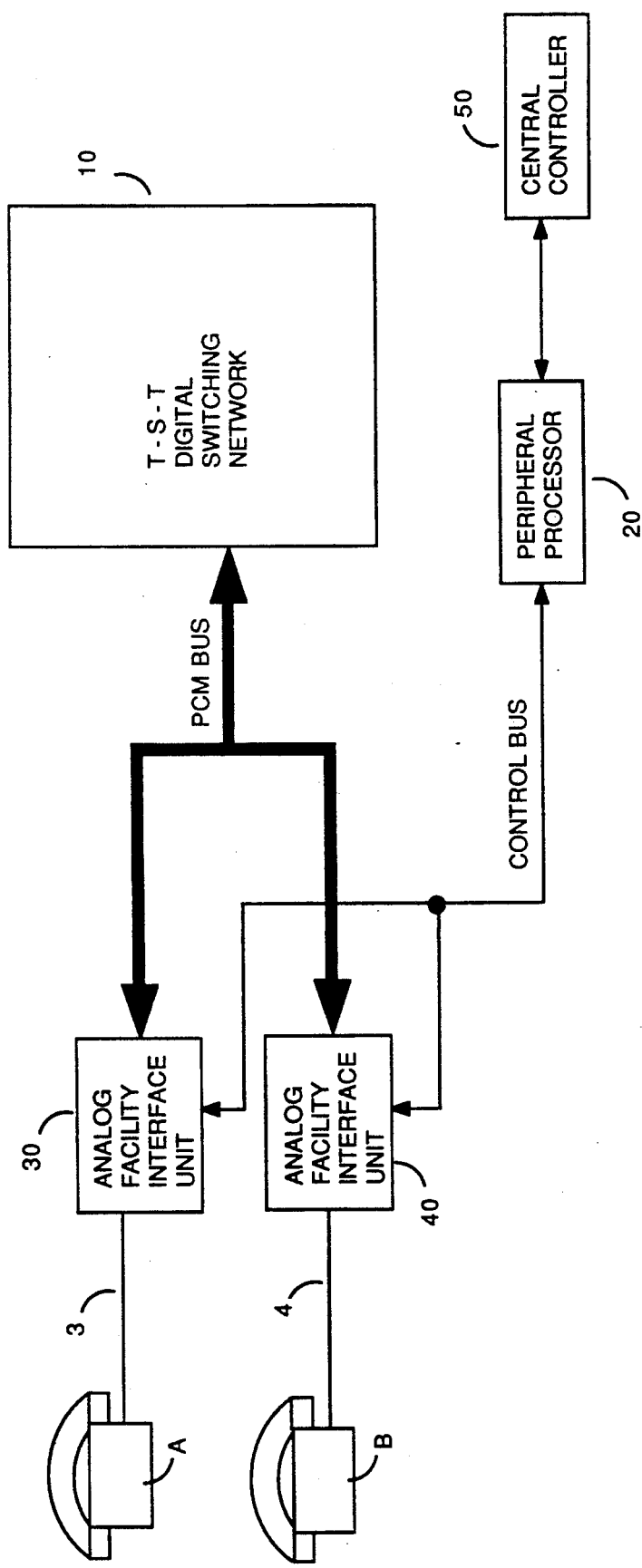
FIG. 1 is a simplified block diagram of a T-S-T central office switching system where the enhanced high voltage line interface circuit in accordance with the present invention is used to advantage.

Turning now to FIG. 1 of the included drawings a central office switching system or central office exchange of the type to which the invention is used to advantage is illustrated. The central office switching system includes a time division multiplexed Time-Space-Time (T-S-T) digital switching network 10 consisting minimally of an originating time switch and control unit, a space switch unit and a terminating time and control unit (not shown). The T-S-T network 10, connects to Analog Facility Interface Units (AFIU) 30 and 40 via a Pulse Code Modulation (PCM) bus. Each AFIU 30 and 40 allow, in this embodiment, the connection of subscriber lines 3 and 4 respectively to the network 10. Subscriber lines 3 and 4 further connect to subscriber telephone instruments A and B, respectively. The network 10 and each AFIU 30 and 40 is further connected to a Peripheral Processor (PP) 20, via a CONTROL BUS. The PP 20 maintains control of its environment by scanning the AFIUs 30 and 40 and controlling the associated network time and control units. The total control of the network connections within the network 10 is the responsibility of the Central Controller (CC) 50. That is, the central controller 50, via the PP 20, informs the time and control units of the time switch connections and also informs the space switch unit of the space switch connections. In addition the CC 50 maintains a data base of the call processing and administrative software for the central office switching system.

Analog voice signals from the transmitter of subscriber instrument A are transmitted to AFIU 30 where they are converted to PCM encoded digital signals. The PCM encoded digital signals are then inserted into available channels on the PCM BUS and transmitted to the digital switching network 10. Under control of the PP 20 the PCM encoded digital signals from subscriber A are switched through the digital switching network 10 and transmitted to AFIU 40 on the PCM BUS. The received PCM encoded digital signals are converted back to analog voice signals and transmitted via subscriber line 4 to the receiver of subscriber instrument B. The enhanced high voltage line interface circuit of the present invention is located within the associated AFIUs.

Figure 2:
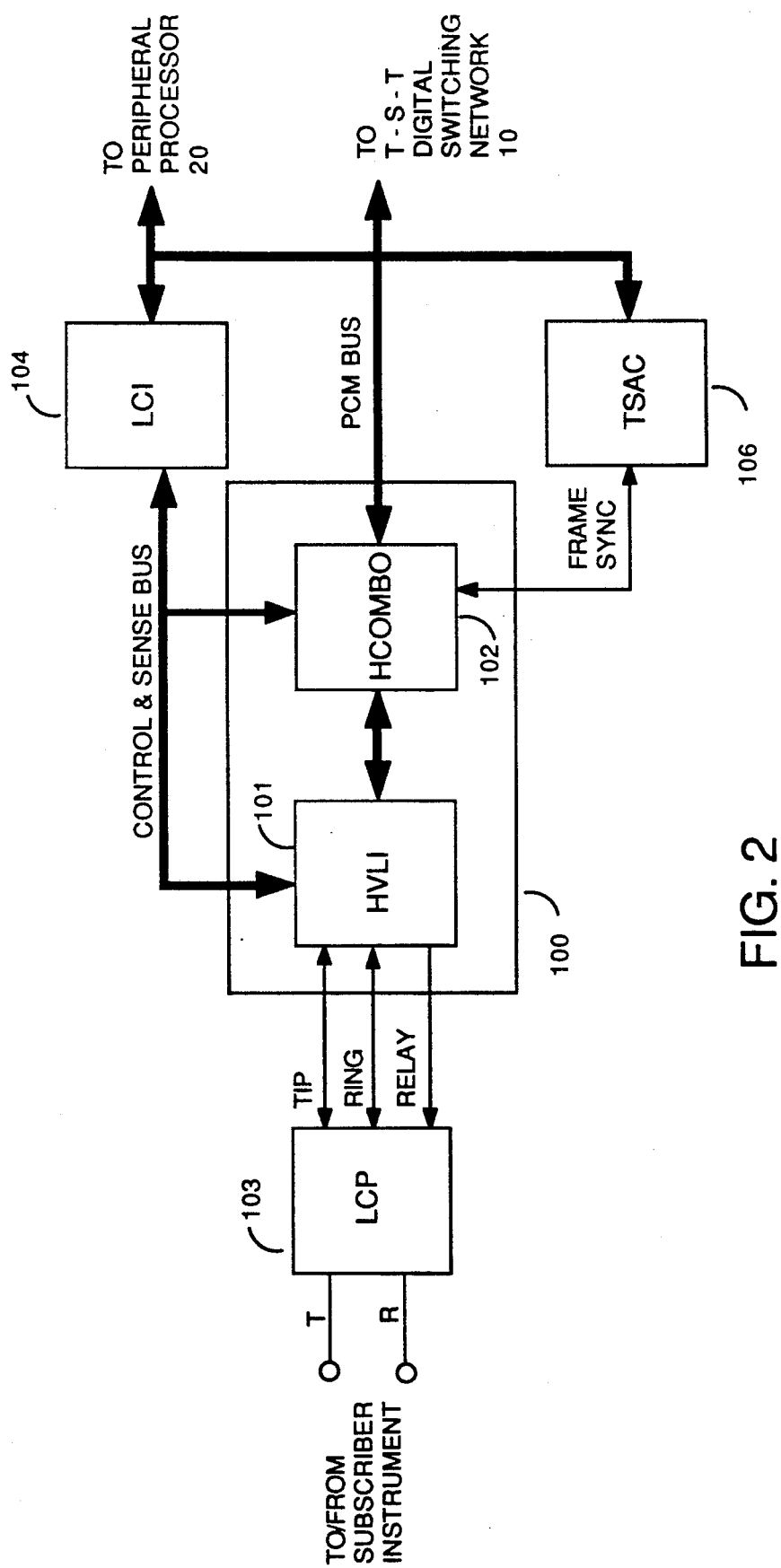
FIG. 2 is a block diagram showing the enhanced high voltage line, interface circuit connected as part of a SLIC circuit in accordance with the present invention.

Turning now to FIG. 2 of the included drawings, a block diagram of a Subscriber Line Interface Circuit (SLIC) including the enhanced High Voltage Line Interface Circuit (HVLI) in accordance with the present invention is shown. The SLIC shown in FIG. 2 is arranged to interface a single subscriber line comprised of a Tip (T) lead and Ring (R) lead to the T-S-T digital switching network 10. The SLIC includes a thick-film transmission hybrid (XBRID) module 100. All critical analog components of the SLIC are contained on the XBRID module 100. XBRID module 100 includes an HVLI circuit 101 and a Hybrid Combo (HCOMBO) circuit 102 along with matched resistor networks and battery feed transistors (not shown). An HVLI 101 and a HCOMBO 102 form one functional SLIC that in combination provide most of the so-called BORSCHT-functions. In particular, the function of the subscriber power supply (Battery), line status monitoring (Signals, Supervision), analog-digital conversion (Coding), filter and two wire-four wire transition (Hybrid) are provide by the HVLI 101 and HCOMBO 102 of XBRID module 100.

In addition to powering the subscriber line, the HVLI 101 performs the essential two wire-four wire hybrid function of splitting the balanced signal on the T and R leads to separate transmit/receive paths. Differential audio signals are transmitted and received to/from the HCOMBO 102 via the HVLI 101. The HVLI 101 further performs loop supervision, ring trip detection, ground sensing and over-current detection. The HCOMBO 102 synthesizes the input impedance of the SLIC and performs hybrid balance echo cancellation. Additionally, the HCOMBO 102 converts the differential audio signals from the HVLI 101 to PCM encoded digital signals and from PCM encoded digital signals to differential audio signals. A more detailed explanation of the electrical structure and operation of HCOMBO 102 may be had by reference to co-pending U.S. patent application Ser. No. 07/599,533.

The remainder of the BORSCHT functions are provided by the Line Configuration and Protection (LCP) circuit 103, located off the XBRID module 100. The LCP 103 appears between the T and R leads of a subscriber line and the HVLI 101. The LCP 103 functions to provide overvoltage protection (Overvoltage), the application of ringing current to the subscriber line (Ringing) and testing of the subscriber line as well as the SLIC (Test). The LCP 103 contains ring relays which under software control inject ringing current from a ringing generator (not shown) to the subscriber line. Similarly, the subscriber line as well as the SLIC can be isolated and tested via a test relay (not shown) that provides facility test (Out Test) and circuit test (In Test). The test relay allows the application of test signals from a test program which resides in the CC 50.

A Line Control Interface (LCI) circuit 104, performs all of the control and sense logic functions for the XBRID module 100. In particular, the LCI 104 functions to administer and control the ringing and test relays, hook status reporting, dial pulse detection, ring trip, ground sensing, and over-current detection. The LCI 104 connects its associated XBRID module 100 to PP 20 via a control and sense bus. A more detailed explanation of the electrical structure and operation of LCI 104 may be had by reference to co-pending U.S. patent applications Ser. Nos. 07/599,536 and 07/599,534.

A PCM bus connects directly to HCOMBO 102, and is enabled by a Time Slot Assigner Circuit (TSAC) device 106. PCM digital data from the network, and PCM digital data to and from the HCOMBO 102, is transmitted via the PCM bus. The TSAC 106 functions to generate transmit and receive frame sync pulses to its connected HCOMBO device 102. The network provides a required 1.544 MHz clock 35 with a nominal 50% duty cycle for the purpose of shifting PCM data in and out of the HCOMBO 102 data registers. A frame (125 μsec) provides for 24 eight bit PCM channels with one framing bit for synchronization. One such TSAC device is the TP3155 Time Slot Assigner Circuit manufactured by the National Semiconductor Corporation.

Figure 3:
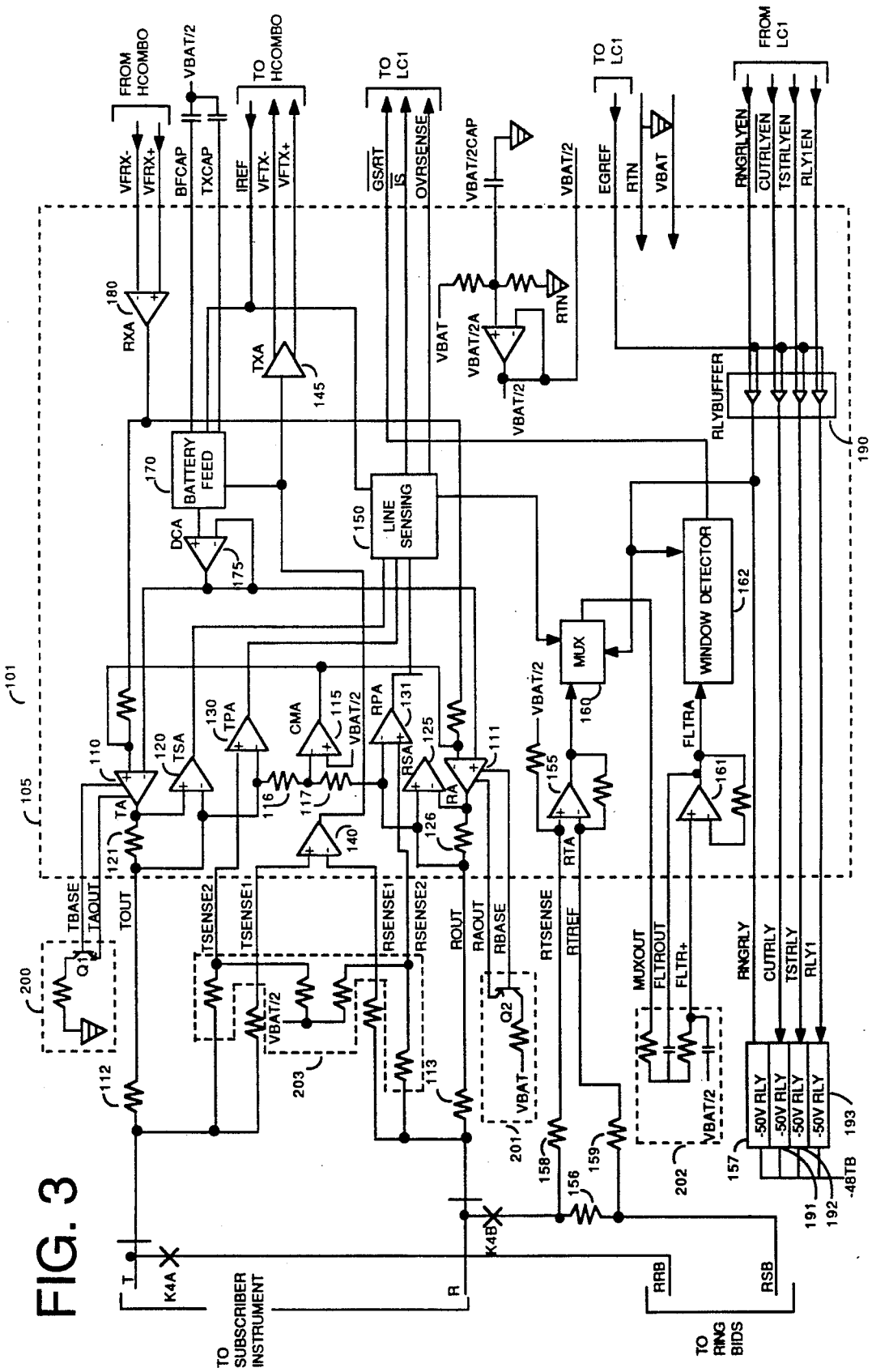
FIG. 3 is a schematic diagram of the enhanced high voltage line interface circuit of the present invention

Turning now to FIG. 3 of the included drawings, the HVLI 101 circuit of present invention is shown in schematic form. HVLI 101 is constructed as a bipolar monolithic Integrated Circuit (IC) for the purpose of interfacing a standard two wire subscriber loop to a central office exchange. The IC includes the components within broken line 105. Transistor Q1, Q2 and the resistor capacitor network outlined by broken line 200, 201, 202 and 203, reside on XBRID 100 but are not a part of the internal architecture of the HVLI 101 circuit. The other line components associated with the Tip (T) and Ring (R) leads are contained within the LCP 103. These LCP 103 components are shown here to aid in the explanation of HVLI circuit 101.

The Tip Amplifier (TA) circuit 110 and Ring Amplifier (RA) circuit 111 function to feed dc and ac voltages and currents to the tip (T) and ring (R) leads respectively of the subscriber loop. The TA 110 works in conjunction with transistor 200 to form a transconductance amplifier that provides precisely controlled current drive to the T lead of the subscriber loop. TA 110 provides nominal loop current of 20-45 mA by controlling the base drive of transistor 200 via the TBASE lead. TA amplifier 110 and HVLI 101 are protected from destructive transient voltages by resistor 112. Resistor 112 is of a low ohmic value and is arranged to drop any large voltages or currents induced into the T lead. Such as transient voltage surges caused by lightning strikes.

Similarly, the RA amplifier 111 works in conjunction with transistor 201 to form a transconductance amplifier. RA 201 also provides a nominal loop current of 20-45 mA to the R lead of the subscriber loop by controlling the base of transistor 201 via the RBASE lead. RA amplifier 111 is protected from destructive transient voltages by resister 113. Resistor 113 is of a low ohmic value and is arranged to drop any large voltages or currents which may be induced into the R lead. Such as transient voltage surges caused by lightning strikes. A control voltage input into TA 110 and RA 111 is converted into output current at the T lead and R lead respectively, of HVLI 101. Further, TA 110 and RA 111 are each capable of sourcing or sinking current depending on the control input voltage.

The TA 110 and RA 111 circuits are connected to a Common-Mode Amplifier (CMA) circuit 115. CMA circuit 115 is used to sense the voltage across the subscriber loop. The output of CMA amplifier 115 is fed to TA 110 and RA 111. A representation of the common-mode voltage across the T and R leads is developed by a voltage divider network comprised of resistors 116 and 117. Resistors 116 and 117 are connected in series across the T and R leads of the subscriber loop. The voltage developed by the voltage divider is fed to the negative input of CMA 115 while the positive input is connected to a source of one half the central office battery voltage (VBAT/2). Resistors 116 and 117 are internal to the IC package of HVLI 101. When there is no common mode voltage, the CMA 115 circuit applies VBAT/2 to the TA 110 and RA 111 circuits. Further, CMA 115 is referenced to VBAT/2 such that the output of CMA 115 is of the same polarity and directly proportional to the common mode signal on the T and R leads. Additionally, CMA 115 synthesizes longitudinal (common-mode) input impedance at the T and R leads of HVLI 101 that is a virtual ac ground.

The sensing of tip lead current flowing within the subscriber loop, such when the T and R leads are connected together (responsive to a subscriber instrument going off-hook), is performed by the Tip Sense Amplifier (TSA) circuit 120. TSA 120 is a differential amplifier circuit that monitors the voltage across feed resistor 121. The output of TSA 120 is a linear voltage representing the absolute value of the T lead current. This voltage output is sent to Line Sensing circuit 150 where output signal LS (Loop Sense) is generated and sent to LCI circuit 104, signaling that current is flowing through the subscriber loop.

A Ring Sense Amplifier (RSA) circuit 125 identical to TSA 120 is also provided and is connected across feed resistor 126. RSA 125 senses ring lead current in the subscriber loop when the R lead is connected to earth ground (used in some multi-party phones). The output of RSA 125 is a linear voltage representing the absolute value of the R lead current. This voltage output from RSA 125 is sent to Line Sensing circuit 150.

A Tip Protection Amplifier (TPA) 130 and a Ring Protection Amplifier (RPA) 131 are connected across the T and R lead feed resistors 112 and 113 respectively, and are used to detect overcurrent conditions in the subscriber loop. This pair of differential operational amplifiers each monitor their respective leads of the subscriber loop and each develop an output signal that is linear and proportional to the current flowing through resistors 112 and 113. The signals from TPA 130 and RPA 131 are connected to line sense circuit 150 where they are analyzed to detect whether an overcurrent condition has occurred. When a loop current of 100 mA or greater is detected by TPA 130 or RPA 131, signal OVERSENSE is generated and transmitted to LCI circuit 104.

Voice signals from the subscriber instrument transmitter are represented as a difference voltage between the T and R leads of the subscriber loop. A Difference Amplifier (DA) 140 functions to buffer and amplify the voltage difference between the T lead and the R leads. The positive input of DA 140 is connected via the TSENSEI line to the T lead, and the negative input of DA amplifier 140 is connected via the RSENSEI line to the R lead. The voltage difference between the T and R leads sensed by DA 140 is converted into a single ended audio output and passed to Transmit Amplifier (TXA) 145. TXA 145 converts the received single ended audio signal to a fully differential form. The differential signal representations are passed to the HCOMBO 102 via VFTX− and VFTX+ for conversion to Pulse coded Modulation (PCM) digital data.

The sensing of a subscriber instrument going off-hook during a ringing cycle is the function of Ring Trip Amplifier (RTA) 155. RTA 155 is an operational amplifier referenced to VBAT/2, that monitors the voltage across resistor 156. When ring relay 157 is operated relay contacts K4A and K4B are made. This applies an ac ringing current to the T and R leads from RRB and RSB respectively of the ring bus. Dc current will not flow in the ring bus until the subscriber instrument hook-switch is closed (when the subscriber goes off-hook). The voltage dropped by resistor 156, in response to dc current flowing in the ring bus, is sensed by RTA 155 and a signal is output to Multiplexer (MUX) circuit 160. Resistors 158 and 159 provide protection to RTA 155 from large voltage values on the ring bus.

MUX 160 selects an analog signal from either RTA 155 or from Line Sensing circuit 150. The analog signal from Line Sensing circuit 150 is the differential output of RSA 125 and TSA 120 (ground sensing). The selection is made dependent on the status of the Ring Relay Enable (RNGRLYEN) signal input from the LCI circuit 104. RNGRLYEN is a logic signal that operates ring relay 157 when it transitions to a logic high logic signal. When RNGRLYEN is a logic low signal, MUX circuit 160 selects the ground sensing signal from RSA 125. When RNGRLYEN is a logic high signal the ring trip signal from RTA 155 is selected. The ground sensing or ring trip signal passed by MUX 160 is passed to Filter Amplifier (FLTRA) 161. FLTRA 161 is a low pass filter designed to attenuate the presence of 16.7 to 66.7 Hz from either the ground sense or ring trip signal input from MUX 160. Window Detector circuit 162 receives the output of FLTRA 161 and determines when the signal from FLTRA 161 is above or below a specific dc threshold. When the target threshold is exceeded, the presence of Ground Sense GS or Ring Trip RT is signaled to LCI 104 via the GS/RT lead.

The Battery Feed circuit 170 is arranged to provide a dc control voltage to the Differential Control Amplifier (DCA) 175, that sets the dc current level in the subscriber loop. The output of the DA 140 is summed with a precision reference (IREF) generated in the HCOMBO circuit 102 and VBAT/2, thereby, generating the dc output signal. The output of BATTERY FEED 170 is applied TO DCA 175 which supplies a bipolar drive voltage to TA 110 and RA 111 to control the subscriber loop current.

Audio signals intended to be output to the subscriber loop and the subscriber instrument receiver are received by HVLI 101 via VFRX− and VFRX+ from the HCOMBO 102. The signals received are in a fully differential form and are combined into a buffered single ended analog voice signal by the Receive Amplifier (RXA) circuit 180. The output signals of RXA 180 are applied to the positive input of TA 110 and the negative input of RA 111, were in conjunction with the drive voltage from the DCA amplifier, the analog voice signals are transmitted along the subscriber loop to the subscriber instrument receiver.

HVLI 101 also includes a Relay Buffer (RLYBUFFER) 190 comprising a plurality of relay drivers with open emitter outputs. The relay drivers of RLYBUFFER 190 are used to apply or remove a ground to relays 157 and 191-193. RLYBUFFER 190 receives a ground reference input EGREF from LCI 106 and relay enable signals that activate the respective connected relays. For example, when the ring relay enable signal RNGRLYEN is at a logic high level the RLYBUFFER outputs signal RNGRLY to relay 157 which operates contacts K4A and K4B, connecting the ring bus to the subscriber loop. All enable signals that operate relays 157 and 191-192 operate on logic high signals with exception of the Cut Relay (CUTRLY). When power to the LCI 104 and HCOMBO 102 is lost, but ground is still maintained, all relay outputs of the HVLI 101 will deenergize. A logic low level signal at CUTRLYEN will energize relay 191 breaking the connection of the T and R leads from the LCP 103, thereby, isolating HVLI 101 from the subscriber loop.

The enhanced high voltage line interface circuit just described can be manufactured as a single compact large scale integrated circuit using any of the presently known techniques used to build microcircuits. The enhanced high voltage line interface circuit of the present invention also benefits from the increased reliability inherent in solid state construction as well the economies in labor cost and manufacture which are enjoyed by such devices.

It will be obvious to those skilled in the art that numerous modifications to the present invention can be made without departing from the scope of the invention as defined by the appended claims. In this context, it should be recognized that the essence of the invention resides in an enhanced high voltage line interface circuit that will effectively and efficiently couple a subscriber instrument to a telephone switching system.

What is claimed is:

1. An enhanced high voltage line interface circuit connected to a subscriber instrument via the tip lead and a ring lead of a subscriber loop, said enhanced high voltage line interface circuit comprising:

tip drive means connected to said tip lead arranged to convert feed voltage from a central office battery to tip feed current on said subscriber loop;

ring drive means connected to said ring lead arranged to convert feed voltage from a central office battery to ring feed current on said subscriber loop;

common-mode sensing means connected to said tip and said ring leads and to said tip drive and said ring drive means, said common-mode sensing means arranged to sense the voltage dropped across said subscriber loop and output a control voltage to said tip drive means and said ring drive means, for controlling the tip feed current and the ring feed current produced by said tip drive means and said ring drive means, respectively;

tip current sensing means connected to said tip lead, said tip current sensing means arranged to sense and develop an output signal when current is flowing in the subscriber loop responsive to said subscriber instrument going off-hook;

ring current sensing means connected to said ring lead, said ring current sensing means arranged to sense and develop an output signal when current is flowing in the subscriber loop responsive to said ring lead at said subscriber instrument connected to earth ground;

tip lead protection means connected to said tip lead, said tip lead protection means arranged to detect overcurrent conditions in said tip lead of said subscriber loop and to provide an output voltage that is proportional to the current flowing in said subscriber loop;

ring lead protection means connected to said ring lead, said ring lead protection means arranged to detect overcurrent conditions in said ring lead of said subscriber loop and to provide an output voltage that is proportional to the current flowing in said subscriber loop;

differential amplifier means connected to said tip lead and said ring lead for detecting the voltage difference between said tip lead and said ring lead associated with the transmission of voice signals from said subscriber instrument, said differential amplifier means further arranged to develop signal ended output signals responsive to said voice signal transmissions;

transmit amplifier means connected to said differential amplifier means and arranged to receive and convert said differential amplifier means single ended output into a fully differential voltage representation of said voice signal transmissions;

line sensing means connected to said tip current sensing means and said ring current sensing means, and operated in response to said tip current sensing means output signal, to generate a logic signal indicating that a current is flowing in the tip lead of said subscriber loop, and further operated in response to said ring current sensing means output signal to generate a ring sense amplifier output signal, and said line sensing means further connected to said tip lead protection means and said ring lead protection means, and operated in response to said tip lead protection means output voltage or, alternatively, said ring lead protection means output voltage, exceeding a preset threshold, to generate a logic signal which signals an overcurrent condition in said subscriber loop;

ring trip amplifier means connected to said subscriber loop arranged to sense and develop a ring trip output signal responsive to a dc current flowing in said subscriber loop when said subscriber instrument goes off-hook during a ringing cycle;

selection means connected to said ring trip amplifier means and said line sensing means, said selection means arranged to receive said ring trip output signal and said ring sense amplifier output signal, said selection means developing a logic signal indicating either a ring trip or a ground sense condition, respectively, in said subscriber loop;

battery feed circuit means connected to the output signal of said differential amplifier means and to a source of precision reference current, said battery feed circuit means summing said differential amplifier means output signal with said precision reference current and developing and applying to said tip drive means and said ring drive means in said subscriber loop; and receive amplifier means connected to a source of differential voltage audio voice signals intended to be transmitted to said subscriber instrument, said receive amplifier means converting said differential voltage voice signals to single ended voice signals and transmitting said single ended voice signals to said tip drive means and said ring drive means for transmission to said subscriber instrument.

2. The enhanced high voltage line interface circuit as claimed in claim 1, wherein said tip drive mans is an operational amplifier circuit operating as a transconductance amplifier converting input voltage to output current gain.

3. The enhanced high voltage line interface circuit as claimed in claim 1, wherein said ring drive means is an operational amplifier circuit operating as a transconductance amplifier converting input voltage to output current gain.

4. The enhanced high voltage line interface circuit as claimed in claim 1, wherein, said common-mode sensing means further includes a resistor network connected between said tip lead and said ring lead, said resistor network arranged to sense the voltage dropped across said subscriber loop and develop a common-mode voltage.

5. The enhanced high voltage line interface circuit as claimed in claim 4, wherein said common-mode sensing means comprises an operational amplifier circuit having its positive input connected to said resistor network and arranged to receive said common-mode voltage, and a negative input connected to a bias voltage, whereby said common-mode amplifier circuit develops and outputs to said tip and said ring drive amplifier circuits a negative feedback control voltage which offsets the current drive of said tip and ring drive amplifiers.

6. The enhanced high voltage line interface circuit as claimed in claim 1, wherein said tip current sensing means includes a feed resistor connected to said tip lead and said tip current sensing means further includes an operational amplifier having its inputs connected across said feed resistor, said tip current operational amplifier arranged to produce said output signal when said feed resistor develops a voltage responsive to feed current flowing in said tip lead.

7. The enhanced high voltage line interface circuit as claimed in claim 1, wherein said ring current sensing means includes a feed resistor connected to said ring lead and said ring current sensing means further includes an operational amplifier having its inputs connected across said feed resistor, said ring current operational amplifier arranged to produce said output signal when said feed resistor develops a voltage responsive to feed current flowing in said ring lead.

8. The enhanced high voltage line interface circuit as claimed in claim 1, wherein said tip lead protection means includes a protection resistor connected to said tip lead and said tip protection means further includes an operational amplifier having its inputs connected across said protection resistor, whereby, responsive to the amount of current flowing in said tip lead, said tip protection operational amplifier produces and outputs a voltage proportional to the voltage sensed by said protection resistor.

9. The enhanced high voltage line interface circuit as claimed in claim 1, wherein said ring lead protection means includes a protection resistor connected to said ring lead and said ring protection means further includes an operational amplifier having its inputs connected across said protection resistor, whereby, responsive to the amount of current flowing in said ring lead, said ring protection operational amplifier produces and outputs a voltage proportional to the voltage sensed by said protection resistor.

10. The enhanced high voltage line interface circuit as claimed in claim 1, wherein said ring trip amplifier means is an operational amplifier, and there is further provided a ring bus connected to a source of ringing voltage and current and to the tip and ring leads of said subscriber loop via a ringing relay, said ringing relay arranged to be activated via a ring enable signal to connect said ring bus and said source of ringing voltage current to said subscriber loop, and said ring bus further includes a ring resistor and said ring trip amplifier has its inputs connected across said ring resistor, and in response to said dc current flowing in said ring bus the voltage developed across said resistor is coupled to said ring trip amplifier, whereby, said ring trip amplifier develops said ring trip output signal.

11. The enhanced high voltage line interface circuit as claimed in claim 10, wherein said selection means comprises.
  a multiplexer circuit connected to said ring trip amplifier, said line sensing means and said ring relay enable signal, said multiplexer circuit selecting said ring trip output signal when said ring relay enable signal is active or alternatively said ring sense amplifier output signal when said ring relay enable signal is inactive;
  a filter circuit for attenuating the presence of 16.7 to 66.7 Hz from said output signal selected by said multiplexer; and
  a comparator circuit connected to said filter circuit, said comparator circuit receiving said attenuated selected output signal from said filter circuit and comparing said attenuated signal to a dc threshold, whereby, said comparator circuit develops a logic level output signal when said threshold is exceeded.

12. In combination:
  means for converting voltage to current connected to the tip and the ring leads of a subscriber loop, said means for converting arranged to convert input voltage to feed current on said subscriber loop;
  means for sensing the voltage dropped across said subscriber loop, arranged to output a control voltage to said means for converting offsetting said feed current on said subscriber loop;
  means for sensing current connected to said tip and said ring leads of said subscriber loop and arranged to develop an output signal responsive to the presence of feed current in said tip and said ring leads;
  means for detecting connected to said tip and ring leads of said subscriber loop, arranged to detect the voltage difference between said tip lead and said ring lead associated with the transmission of voice signals on said subscriber loop;
  means for line sensing connected to said means for sensing current, arranged to develop a logic level signal in response to the presence of feed current in said tip lead;
  means for detecting ring trip connected to said subscriber loop and arranged to develop an output signal responsive to dc ringing current flowing in said subscriber loop;
  means for selecting the output signal of said means for detecting ring trip or alternatively said means for sensing current, and means for comparing said selected output signal to a preset threshold arranged to produce a logic level output signal responsive to said selected output signal exceeding said threshold; and
  means for feeding connected to the output signal of said means for detecting and to a source of precision reference current, said means for feeding summing the output signal of said means for detecting with said precision reference current and developing and applying to said means for converting a bipolar drive voltage for controlling the feed current applied to said subscriber loop.

13. The combination as claimed in claim 12, wherein said combination further includes means for sending connected to a source of differential voltage audio voice signals intended to be transmitted on said subscriber loop, said means for sending converting said differential voltage voice signals to single ended voice signals and transmitting said single ended voice signals to said means for converting voltage for transmission of said single ended signals on said subscriber loop.

14. The combination as claimed in claim 12, wherein said combination further includes means for protecting connected to said tip and said ring leads of said subscriber loop, arranged to produce an output voltage proportional to the feed current flowing in said subscriber loop.

15. The combination as claimed in claim 14, wherein said means for protecting is connected to said means for line sensing and said means for line sensing is further arranged to produce a logic signal responsive to said means for protecting output voltage exceeding a preset reference voltage level.

16. In combination:
  a subscriber loop having a tip lead and a ring lead;
  means for converting voltage to current connected to the tip lead and said ring lead of a subscriber loop, said means for converting arranged to convert input voltage of feed current on said subscriber loop;

means for sensing the voltage dropped across said subscriber loop arranged to output a control voltage to said means for converting offsetting said feed current on said subscriber loop;

means for detecting connected to said tip and ring leads of said subscriber loop, arranged to detect the voltage difference between said tip lead and said ring lead associated with the transmission of voice signals on said subscriber loop;

means for feeding connected to the output signal of said means for detecting and to a source of precision reference current, said means for feeding summing the output signal of said means for detecting with said precision reference current and developing and applying to said means for converting a bipolar drive voltage for controlling the feed current applied to said subscriber loop; and means for sending connected to a source of differential voltage audio voice signals intended to be transmitted on said subscriber loop, said means for sending converting said differential voltage voice signals to single ended voice signals and transmitting said single ended voice signals to said means for converting voltage for transmission of said single ended signals on said subscriber loop.

17. The combination as claimed in claim 16, wherein said combination further includes means for sensing current connected to said tip ring leads of said subscriber loop and arranged to develop an output signal responsive to the presence of feed current in said tip and said ring leads, and means for line sensing connected to said means for sensing current arranged to develop a logic level signal in response to the presence of feed current in said tip lead.

18. The combination as claimed in claim 17, wherein said combination further includes means for protecting connected to said tip and said ring leads of said subscriber loop arranged to produce an output voltage proportional to the feed current flowing in said subscriber loop, and said means for protecting is connected to said means for line sensing, and said means for line sensing is further arranged to produce a logic signal responsive to said means for protecting output voltage exceeding a preset reference voltage level.

19. The combination as claimed in claim 17, wherein said combination further includes means for detecting ring trip connected to said subscriber loop and arranged to develop an output signal responsive to dc ringing current flowing in said ring lead, and selecting and comparing means operated to select the output signal of said means for detecting ring trip or alternatively said means for sensing current, and further operated to compare said selected output signal from said means for detecting ring trip to a preset threshold and producing a logic level output signal responsive to said selected output signal exceeding said threshold.

* * * * *